United States Patent
Yamamoto et al.

(10) Patent No.: US 6,203,207 B1
(45) Date of Patent: Mar. 20, 2001

(54) ROLLING BEARING

(75) Inventors: Toyohisa Yamamoto; Hiroyuki Ito, both of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/391,599

(22) Filed: Sep. 8, 1999

(30) Foreign Application Priority Data

| Sep. 8, 1998 | (JP) | 10-253976 |
| Dec. 21, 1998 | (JP) | 10-362993 |
| Jul. 30, 1999 | (JP) | 11-216692 |

(51) Int. Cl.$^7$ ............................................. F16C 33/44
(52) U.S. Cl. .................................. 384/492; 384/909
(58) Field of Search ................... 384/492, 569, 384/907, 908, 909, 911

(56) References Cited

U.S. PATENT DOCUMENTS

| 4,919,552 | * | 4/1990 | Ramos | 384/492 |
| 5,028,151 | * | 7/1991 | Nisley | 384/477 |
| 5,605,401 | * | 2/1997 | Kondo et al. | 384/492 |
| 5,904,426 | * | 5/1999 | Tsuru et al. | 384/462 |
| 5,988,891 | * | 11/1999 | Yamamoto et al. | 384/463 |

FOREIGN PATENT DOCUMENTS

| 55-34002 | 3/1980 | (JP) . |
| 57-56218 | 4/1982 | (JP) . |
| 2-190614 | 7/1990 | (JP) . |
| 5-202943 | 8/1993 | (JP) . |
| 06074238 | 3/1994 | (JP) . |
| 8-26894 | 3/1996 | (JP) . |
| 2709119 | 10/1997 | (JP) . |

* cited by examiner

Primary Examiner—Thomas R. Hannon
(74) Attorney, Agent, or Firm—Evenson, McKeown, Edwards & Lenahan, P.L.L.C.

(57) ABSTRACT

An inner ring 2, an outer ring 1 and a cage 4 are made of a resin composition comprising a melt-moldable fluoro-resin as a main ingredient, which can provide a rolling bearing capable of maintaining lubricity for a long period of time even when it is used in a corrosive aqueous solution or under a circumstance where mists or droplets of a corrosive solution are present.

7 Claims, 6 Drawing Sheets

CONTENT OF A POTASSIUM TITANATE WHISKER (WEIGHT %)

FIG. 11

CONTENT OF A PTFE POWDER (WEIGHT %)

ROLLING BEARING

BACKGROUND OF THE INVENTION

1. Field of the Invention

The present invention relates to a bearing having a long working life in a corrosive aqueous acidic or alkaline solution or under the circumstance where mists or droplets of a corrosive aqueous solution are present.

2. Description of Related Art

Generally, a rolling bearing comprises an inner ring having an inner ring raceway on an outer circumferential surface, an outer ring having an outer ring raceway on an inner circumferential surface, a plurality of rolling elements disposed rotably between the raceways of the inner and the outer rings, and a cage for guiding and supporting the plurality of rolling elements between the raceways of the inner and outer rings. There is also a rolling bearing of a full type ball bearing structure not having any cage.

Such rolling bearing is usually lubricated by circularly supplying lubricant oil or grease to the bearing, or sealing the same to the inside of the bearing. In addition, it is necessary to prevent intrusion of mists and droplets of a corrosive aqueous acidic or alkaline solution to the inside of the bearing under the circumstance that such mists and droplets are present. For this purpose, Japanese Utility Model Unexamined Publication No. Sho 55-34002 and Japanese Utility Model Unexamined Publication No. Sho 57-56218 have disclosed techniques to fill lubricant or grease to a space of the bearing to conduct lubrication, as well as to dispose a contact type seal or a labyrinth seal to the bearing to prevent intrusion of water or the like to the inside of the bearing.

However, in the contact type seal, since the lip of the contact seal is worn along with the rotation of the bearing, a gap is sometimes caused between the lip and the seal surface, and intrusion of water from the gap can not be prevented completely. Also, the labyrinth seal can not prevent intrusion of water from the gap completely. Therefore, even if the contact type seal or the labyrinth seal is disposed, water intrudes into the bearing from the gap caused by the wear of the contact type seal and the gap of the labyrinth seal to soften the lubricant or grease, so that the lubricant or grease splashes during rotation to the outside of the bearing to possibly contaminate external circumstances of the bearing.

Accordingly, when clean circumstance is required such as in clean rooms, manufacturing apparatus for semiconductor devices, manufacturing apparatus for liquid crystal panels and manufacturing apparatus for hard disks, the lubricant and grease can not be used for the lubrication of the bearings.

Then, as a method of lubricating the rolling bearing, there has been proposed a method of not using an lubricant or grease. For example, Japanese Patent Examined Publication No. Hei 8-26894 and Japanese Patent No. 2709119 have disclosed a rolling bearing comprising inner and outer rings made of stainless steel, a cage made of fluoro-resin (consisting only of fluoro-resin or a tetrafluoroethylene-ethylene copolymer containing short fibers of potassium titanate whisker having a diameter of 2 μm or less) and rolling elements made of hard carbon. In the bearing, the fluoro-resin constituting the cage transfers to the rolling element, the inner ring and the outer ring to form a thin lubrication film of the fluoro-resin by frictional contact between the cage and the rolling element.

However, the rolling bearing used in a corrosive aqueous solution or under the circumstance where mists and droplets of a corrosive solution are present can not be prevented completely from corrosion such as occurrence of rusts even if the inner ring and the outer ring are made of stainless steel. Since the corrosion accelerates the increase of wear and the surface roughness of the bearing constituent members, sufficiently long bearing life can not be obtained.

Namely, the rolling bearing comprising an inner ring and an outer ring made of stainless steel, a cage made of fluoro-resin and rolling elements made of hard carbon does not cause contamination of external circumstance by the lubricant, but it involves a drawback that it is difficult to maintain lubrication and obtain sufficiently long bearing life over a long period of time in a corrosive aqueous acidic or alkaline solution or under the circumstance where mists and droplets of an corrosive aqueous solution are present.

SUMMARY OF THE INVENTION

The prevent invention has been accomplished while taking notice on the problem of the prior art described above, and the object thereof is to provide a rolling bearing which can maintain lubrication for a long period of time, as well as causes no contamination of external circumstance by a lubricant even if it is used in a corrosive aqueous acidic or alkaline solution or under the circumstance where mists and droplets of a corrosive aqueous solution are present.

For overcoming the foregoing problems, the present invention provides a rolling bearing comprising at least an inner ring, an outer ring and rolling elements made of a corrosion resistant material, in which at least one of the inner ring and the outer ring is made of one of the following materials (a) to (c). The material includes (a) a melt moldable fluoro-resin, (b) a resin composition comprising the melt moldable fluoro-resin as a main ingredient, and (c) a resin composition in which a fibrous filler and/or a solid lubricant is added to a melt moldable heat resistant resin.

In a rolling bearing having a cage, the cage is preferably made of (d) a resin composition in which a fibrous filler and/or a solid lubricant is added to a melt moldable fuluoro-resin or (e) a resin composition in which a fibrous filler and/or a solid lubricant is added to a melt moldable heat resistant resin.

The rolling bearing according to the present invention, compared with conventional rolling bearings, can maintain the lubricancy for a long period of time even in a case of use in a corrosive aqueous acidic or alkaline solution and under a circumstance where mists and droplets of corrosive aqueous solutions are present.

In the rolling bearing of the present invention, a rolling bearing in which the inner ring and/or the outer ring is made of the material (a) or (b) and the cage is made of the material (d) (hereinafter referred to as a first rolling bearing) has an improved corrosion resistance in a case of use in a corrosive aqueous acidic or alkaline solution and under a circumstance where mists or droplets of a corrosive aqueous solution are present, compared with rolling bearings in which the inner ring and the outer ring are made of stainless steel and the cage is made of other resin compositions than the resin composition described above.

According to the first rolling bearing, since the bearing constituent members comprising the fluoro-resin (inner ring and/or outer ring and the cage) has self-lubricating property and the fluoro-resin constituting the bearing constituent members transfers to the rolling elements to form a thin fluoro-resin lubrication film upon friction contact with the rolling elements, lubricity can be maintained for a long period of time without supplying the lubricant or grease to the inside of the bearing. That is, according to the rolling bearing, since there is no requirement for supplying the lubricant or grease to the inside of the bearing, there is no worry of contaminating the external circumstance with the lubricant.

Further, since the inner ring and/or outer ring and the cage made of the melt moldable fluoro-resin or the resin composition comprising the same as a main ingredient can be formed by injection molding or the like having excellent mass productivity, a production cost can be decreased compared with conventional rolling bearings in which the inner ring and the outer ring are made of stainless steel and the cage is made of other resin composition than described above.

Further, the track way surface of the inner ring and the outer ring made of the melt-moldable fluoro-resin or the resin composition comprising the same as a main ingredient can be finished by machining. Then, when the track surface is finished by machining, since the circularity of the track way can be improved compared with the case of not conducting machine finishing, rolling elements can be rotated smoothly for longer period of time. The circularity in this case is, preferably 20 μm or less, more preferably, 10 μm or less and, further preferably 5 μm or less.

In the rolling bearing of the present invention, a full type rolling structure in which the inner ring and/or the outer ring are made of the material (a) or (b) and having no cage (hereinafter referred to as a second rolling bearing) has improved corrosion resistance in a case of use in corrosive aqueous acidic or alkaline solution and under a circumstance where mists or droplets of a corrosive aqueous solution are present, compared with full type ball rolling bearing in which the inner ring and the outer ring are made of stainless steel.

Also according to the second rolling bearing, since the bearing constituent members comprising the fluoro-resin (inner ring and/or outer ring) have self lubricity and the fluoro-resin constituting the bearing members transfers to the rolling elements upon friction contact therewith to form a thin lubrication film of the fluoro-resin, lubricity can be maintained for a long period of time without supplying the lubricant or grease to the inside of the bearing. That is, since there is no requirement of supplying the lubricant or grease to the inside of the bearings in this rolling bearing, there is no worry of contaminating the external circumstance with the lubricant.

Further, since the inner ring and/or the outer ring made of the melt-moldable fluoro-resin or from the resin composition having the fluoro-resin as a main ingredient can be formed by injection molding or the like of excellent mass productivity, the product cost for the second rolling bearing can be reduced compared with the rolling bearing of the full type ball rolling bearing in which the inner ring the outer ring are made of stainless steel.

In the rolling bearing of the present invention, a rolling bearing in which the inner ring and/or the outer ring are made of the material (c) and the cage is made of the material (e) (hereinafter referred to as a third rolling bearing), the lubricity can be maintained for a long period of time even in a case of use in a corrosive aqueous acidic or alkaline solution and under a circumstance where mists or droplets of corrosive aqueous solution are present, compared with conventional rolling bearings in which the inner ring and the outer ring are solely made of stainless steel or heat resistant resin.

Particularly, the rolling bearing having a bearing ring made of PEEK (polyether ether ketone) as disclosed in Japanese Patent Unexamined Publication No. Hei 5-202943 has a problem that the bearing life is short under the working conditions of high load/high speed rotation since the mechanical strength, wear resistance and lubricating property of the bearing rings are not satisfactory. On the other hand, the bearing life of a rolling bearing having a bearing ring made of a resin composition in which a fibrous filler and/or a solid lubricant is added to PEEK can be extended under the working condition of high load/high speed rotation.

The melt moldable fluoro-resin usable in the rolling bearing of the present invention can include, for example, tetrafluoroethylene—perfluoroalkylvinyl ether copolymer (hereinafter simply referred to as "PFA"), a tetrafluoroethylene—ethylene copolymer (hereinafter referred to as "ETFE"), a polyvinylidene fluoride (hereinafter simply referred to as "PVDF"), a tetrafluoroethylene—hexafluoropropylene copolymer (hereinafter simply referred to as "FEP"), a polychlorotrifluoroethylene (hereinafter simply referred to as "PCTFE"), a chlorotrifluoroethylene—ethylene copolymer (hereinafter simply referred to as "ECTFE"), and they can be used alone or in combination of two or more of them. Among them, PFA, ETFE, PVDF and FEP are particularly preferred as the material for bearings to be used in a corrosive aqueous acidic or alkaline solution or under a circumstance where mists and droplets of a corrosive solution are present since they are excellent in self-lubricating property and corrosion resistance.

The melt moldable heat resistant resin usable for the bearing of the present invention can include, for example, a polyether nitrile (hereinafter simply referred to as "PEN"), a polyether ether ketone (hereinafter simply referred to as "PEEK"), a copolymer of polyether ether ketone and polybenzoimidazole (hereinafter simply referred to as "PEEK-PBI"), a thermoplastic polyimide (hereinafter simply referred to as "TPI"), and a thermoplastic aromatic polyamideimide. They can be used alone or in combination of two or more of them. Among them, PEEK and PEEK-PBI are particularly preferred as the material for bearings to be used in a corrosive aqueous acidic or alkaline solution or under a circumstance where mists and droplets of a corrosive solution are present since they are excellent in self-lubricating property and corrosion resistance.

In the rolling bearing of the present invention, the materials for the rolling element are not particularly limited so long as they are corrosion resistant material and stainless steel represented, for example, by SUS440C, LNS125, ES1 or SUS630 can be used. It is preferred that the surface of the rolling element or the entire rolling element is formed by ceramics or glass. The ceramics usable herein can include, for example, silicon nitride ($Si_3N_4$), silicon carbonate (SiC), Sialon, partially stabilized zirconia ($ZrO_2$), hard carbon and alumina ($Al_2O_3$).

LNS125 and ES1 are numbers of standards specified by NSK Ltd. The LNS125 is a martensite type stainless steel having a C content of from 0.6% by weight to 0.7% by weight, an Si content of 1.00% by weight or less, an Mn content of 1.00 % by weight or less and, a Cr content of from 12.0% by weight to 13.5% by weight. ES1 is a martensite type stainless steel having a C content of from 0.44% by weight to 0.46% by weight, an Si content of from 0.2% by weight to 0.4% by weight, an Mn content of from 0.2% by weight to 0.4% by weight, a Cr content of from 12.8% by weight to 13.2% by weight and an N content of from 0.09% by weight to 0.18% by weight.

In a case where the surface of the rolling element or the entire rolling element is formed of ceramics, the corrosion resistance is remarkably improved than in a case where the rolling element is made of a stainless steel. Therefore, even if a corrosive aqueous acidic or alkaline solution should intrude, the bearing is scarcely corroded. In addition, even when a lubrication film is not formed sufficiently to the rolling element by the above-mentioned transfer due to the intrusion of the corrosive aqueous solution, coagulation is hardly caused between the rolling element and the raceway surface if the surface of rolling element or the entire rolling element is made of ceramics. Therefore, the operation of the bearing can be continued for a long period of time, even if the aqueous corrosive solution should intrude.

The solid lubricant which can be blended to the resin composition used in the present invention can include, for example, polytetrafluoroethylene (PTFE) powder, graphite, hexagonal crystal boron nitride (hBN), fluoromica, melamine cyanurate (MCA), an amino acid compound (N-lauro/L-lysin) having a layered crystal structure, fluorographite, fluoropitch and molybdenum disulfide ($MOS_2$). When the inner ring, the outer ring and the cage are formed by the fluoro-resin or a resin composition mainly comprising a heat resistant resin to which such a solid lubricant is blended, the self-lubricating property is improved, and the wear of the lubricant film formed by transfer can be reduced.

The average grain size of the solid lubricant which can be blended in the resin composition is not particularly limited, but it is preferably from 0.1 $\mu$m to 60 $\mu$m. The grains of an average grain size of less than 0.1 $\mu$m cause coagulation between the particles when they are mixed with the fluoro-resin or heat resistant resin as the main ingredient, to sometimes cause not uniform dispersion of the particles. On the other hand, grains having a grain size as large as of 60 $\mu$m or more lower the smoothness on the surface of the molding product and lower the strength, so that the life of the bearing is sometimes shortened. A more preferred range of the average grain size of the solid lubricant which can be blended to the resin composition is from 0.1 $\mu$m to 20 $\mu$m, more preferably, from 0.1 $\mu$m to 10 $\mu$m.

When the solid lubricant is blended to the resin composition, the content in the resin composition is preferably from 5% by weight to 40% by weight (more preferably 30% by weight or less). If the content is less than 5% by weight, the effect of the solid lubricant can not substantially be obtained. On the other hand, if the content exceeds 40% by weight, no further improvement of the lubricating effect can be expected, as well as the mechanical strength of the molding product is lowered, and the wear of the inner ring, the outer ring and the cage as molding products is increased to sometimes shorten the life of the bearing.

The fibrous filler which can be blended to the resin composition can include, for example, aluminum borate whisker, potassium titanate whisker, carbon whisker, aramid fiber, aromatic polyimide fiber, liquid crystal polyester fiber, graphite whisker, glass fiber, carbon fiber, boron fiber, silicon carbide whisker, silicon nitride whisker, alumina whisker, aluminum nitride whisker and wollastonite. When the inner ring, the outer ring and the cage are formed by the resin composition comprising a fluoro-resin or a heat resistant resin, to which such fibrous filler is blended, the mechanical strength and wear resistance of the molding product are improved, so that deformation and wear can be suppressed upon rotation of the bearing. Therefore, the bearing can be operated stably for a long period of time.

As the fibrous filler which can be blended with the resin composition, those having an aspect ratio of from 3 to 200 are preferred. The reinforcing effect of the molding product can not be exhibited sufficiently when the aspect ratio is less than 3, while uniform dispersion upon mixing is extremely difficult when the aspect ratio is more than 200. The fiber diameter of the fibrous filler is not particularly limited, but those having an average fiber diameter of from 0.2 $\mu$m to 30 $\mu$m are preferred. It is more preferably, from 0.3 $\mu$m to 20 $\mu$m and, further preferably, from 0.3 $\mu$m to 5 $\mu$m.

When the fibrous filler is blended with the resin composition, the content thereof in the resin composition is preferably from 5% by weight to 40% by weight. The effect of improving the mechanical strength of the molding product can scarcely be expected when it is less than 5% by weight. Even if it is blended by more than 40% by weight, no further improvement of mechanical strength can be expected, as well as the fluidity upon melt molding the resin composition is extremely lowered. A more preferred content of the fibrous filler in the resin composition is within a range of from 10% by weight to 30% by weight.

In addition, the contents of the solid lubricant and the fibrous filler in total in the resin composition are preferably from 10% by weight to 50% by weight in view of fluidity upon melt molding and the mechanical strength of the molding product. Even if the content of each of the solid lubricant and the fibrous filler in the resin composition is 40% by weight or less, if the contents of both of them in total exceed 50% by weight, the fluidity upon melt molding the resin composition and the mechanical strength of the molding product are sometimes deteriorated greatly.

When the fibrous filler is blended with the resin composition, the surface may be treated with a silane or titanate type coupling agent with a purpose of increasing the bondability with the resin as a base material or dispersing it uniformly in the base material, and may also be applied with other surface-treatment depending on the purpose.

The resin composition which forms the inner ring, the outer ring or the cage of the rolling bearing of the present invention preferably contains a liquid crystal polymer at a ratio of 50% by weight.

When the liquid crystal polymer is added to the melt moldable fluoro-resin or a heat resistant resin, the fluidity of the material upon molding is improved, and the solidifying speed of the resin by cooling in the mold is increased, so that burrs are less caused and the resin can be injected under a relatively low injection pressure. That is, moldability of PEEK or the like of relatively poor fluidity can be improved.

In addition, when the liquid crystal polymer is added to the melt moldable fluoro-resin or the heat resistant resin, since the melt moldable fluoro-resin or the heat resistant resin and the liquid crystal polymer are fibrillated to exhibit a self-reinforcing effect upon kneading or molding of the resin composition, the inner ring, the outer ring or the cage formed by the resin composition can be provided with satisfactory mechanical strength and wear resistance.

The liquid crystal polymer usable in the present invention can include, for example, a semi-aromatic liquid crystal polyester and a wholly aromatic liquid crystal polyester. The semi-aromatic liquid crystal polyester has a basic structure shown by the following chemical formula (1).

(1)

The basic structure comprises two recurring units. Further, a semi-aromatic liquid crystal polyester in which a tertiary ingredient (2,6-naphthalene dicarboxylic acid ingredient) is copolymerized to the basic structure can also be used.

Commercially available semi-aromatic liquid crystal polyester can include, for example, "RODRAN" LC-5000 and LC-5050GM manufactured by Unitika Co. Ltd., "Idemitsu LCP" LCP200J and LCP210J manufactured by Idemitsu Petrochemical Co. Ltd., "NOVACCURATE" E310 manufactured by Mitsubishi Chemical Co., and "K-LCP" manufactured by Kawasaki Seitetsu.

Wholly aromatic liquid crystal polyesters have basic structure shown by following chemical formulae 2 to 5.

The basic structures comprise two or three units.

The wholly aromatic liquid crystal polyester represented by the formula (2) can include, for example, "XYDAR" SRT300 and SRT500 manufactured by Amoco Co. Ltd., "SUMICA SUPER LCP" E2000 and E6000 manufactured by Sumitomo Chemical Industry Co. Ltd., "HAG" and "HBG" manufactured by Toso Sunsteel Co. Ltd. The wholly aromatic liquid crystal polyester shown by the formula (3) can include, for example, "VECTRA" A950 manufactured by Hoechst Celanese Co. Ltd., and "UENO LCP" 1000 and 2000 manufactured by Ueno Pharmacy Co. Ltd.

The wholly aromatic liquid crystal polyester represented by the formula (4) can include, for example, HX-2000 and XH-3000 manufactured by Du Pont Co. Ltd., and "GRANLAR" manufactured by Granmont Co. Ltd. The wholly aromatic liquid crystal polyester represented by the formula (5) can include, "ULTRAX" KR4000 manufactured by BASF Co. Ltd., "VICTREXSRP" 1500G and 2300G manufactured by ICI Co. Ltd, and "POLYSTAL" manufactured by Bayer Co. Ltd.

The content of the liquid polymer in the resin composition is preferably from 5% by weight to 50% by weight. The effect (fluidity, moldability and strength property of the material upon molding) obtained in association with the incorporation of the liquid polymer can not substantially be obtained if the content is less than 5% by weight. If it is blended by more than 50% by weight, no further improvement of fluidity, moldability and strength property can be expected, as well as the effect of other additive ingredients can not be obtained satisfactorily since the amount of other additive ingredients is relatively reduced.

Further when the resin composition contains the liquid crystal polymer and the solid lubricant and/or the fibrous filler, the content of the liquid polymer and the solid lubricant and/or the fibrous filler in total in the resin composition is preferably from 10% by weight to 60% by weight in consideration of the fluidity upon melt molding and the mechanical strength of the molding product. Even if the content for each of the liquid crystal polymer, the solid lubricant and/or the fibrous filler is 40% by weight or less, the fluidity upon melt molding the resin composition and the mechanical strength of the molding product are sometimes degraded greatly if the content of both of them in total is more than 60% by weight.

In the rolling bearing of the present invention, the resin composition which forms the inner ring, the outer ring and the cage may be blended with various kinds of additives, within a range not contrary to the purpose of the invention, for example, antioxidant, heat-stabilizer agent, ultraviolet absorber, photoprotecting agent, flame-retardant, antistatic agent, fluidity improver, amorphous tackifier, crystallization promotor, nucleating agent, pigment or dye.

The method of mixing the solid lubricant and the fibrous filler to the resin composition is not particularly limited. The method may comprise melting a fluoro-resin as the main ingredient, adding and mixing a solid lubricant, a fibrous filler and an additive one by one or placing and pre-mixing all of the materials in a mixer such as a Henschel mixer, a tumbler, a ribbon mixer or a ball mill, and then supplying them into a melt-mixer to melt and knead them. The melt mixer usable for this mixing can include a known melt kneading apparatus such as a single screw or two-screw extruder, a kneading roll, a press kneader, a Banbury mixer, and a Brabender Plastograph. The temperature upon melt-kneading may be within such a range as sufficient for melting the resin as a main ingredient and not causing decomposition.

DESCRIPTION OF THE PREFERRED EMBODIMENTS

Preferred embodiments of the present invention are to be explained more in details by way of concrete examples.

EXAMPLE 1.

No. 1–No. 86

Figure 1:
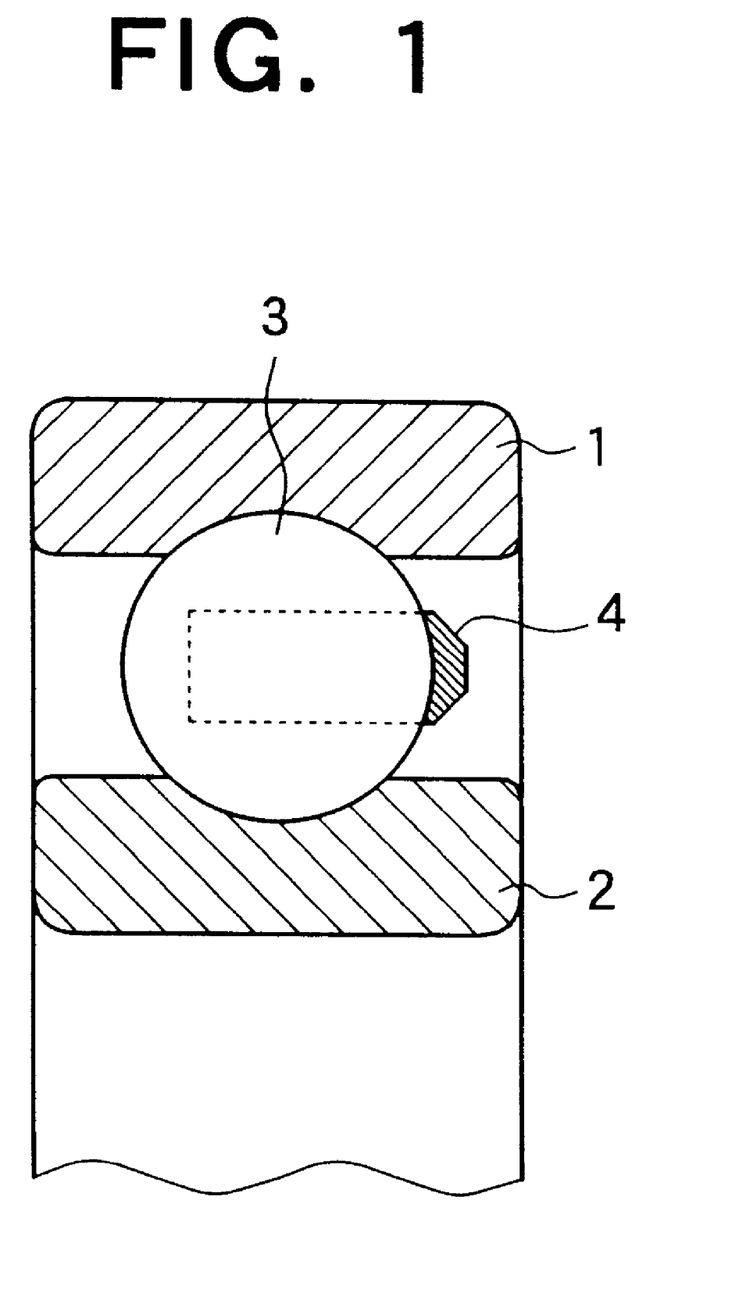
FIG. 1 is a schematic cross sectional view showing a rolling bearing for a preferred embodiment of the present invention.

For rolling bearings used for test, single row deep groove ball bearings (10 mm inner diameter, 26 mm outer diameter, 8 mm width) corresponding to bearing No. 6000 were assembled as No. 1–No. 41, No. 51–No. 53, No. 54–No. 68 and No. 78–No. 86. As shown in FIG. 1, the ball bearing comprises an outer ring 1, an inner ring 2, balls (rolling elements) 3 and a crown type cage 4, in which seals are not disposed. Full type ball bearings using the same shape of inner rings, outer rings and balls as those of the deep groove ball bearings, not using the cage and not disposing the seals were assembled for the rolling bearings as No. 42–No. 50 and No. 69–No. 72.

Constituent materials for the inner ring, the outer rind, the rolling elements and the cage for each of the bearings are shown in the following Table 1 to Table 4. Same materials were used for the inner ring and the outer ring on every sample. The inner rings, the outer rings and the cages made of single component resins or resin compositions as the material were manufactured by injection molding. Resins and additive materials shown below were used.

Melt Moldable Fluoro Resin
  PFA: "NEOFLON PFA AP-201" manufactured by Daikin Industry
  ETFE: "NEOFLON ETFE EP-520" manufactured by Daikin Industry
  PVDF: "KUREHA KF POLYMER-T-#1000" or "KUREHA KF POLYMER-T-#850" manufactured by Kureha Chemical Industry Melt Moldable Heat Resistant Resin
  PEN: "ID300" manufactured by Idemitsu Material
  PEEK: "VICTREX PEEK 150G" manufactured by Victrex
  PEEK-PBI: "CELASOL TU-60" manufactured by Hoechst Celanese Fibrous Filler
  Aluminum borate whisker (simply referred to as "ABW" in Tables 1–3):
  "ALBOREX YS1" manufactured by Shikoku Kasei Industry, average fiber diameter: 0.5–1.0 μm, length: 10–30 μm Potassium titanate whisker (simply referred to as "KTW" in Tables 1–4):
  "TISMO D-101" manufactured by Ohtsuka Kagaku, average fiber diameter: 0.3–0.6 μm, length: 10–20 μm Carbon Fiber
  "KUREKACHOP M-102S" manufactured by Kureha Kagaku Kogyo, average fiber diameter: 14.5 μm, length: 0.2 mm Aramid Fiber:
  "KAINOL FIBER KF02BT" manufactured by Gunei Kagaku Kogyo, average fiber diameter: 14.0 μm, length: 0.2 mm Solid Lubricant PTFE: "LUBRON L-5" manufactured by Daikin Industry, powder of average grain size of 0.2 μm MCA: "MEIAMINESIIANURATE" manufactured by Mitsubishi Kagaku, powder of average grain size of 2.0 μm Fluoro-Pitch :"Fluoro-Pitch" manufactured by Osaka Gas, powder of average grain size of 1.0 μm Fluoro Mica: "Synthetic Mica PDM-9WA" manufactured by, Topy Kogyo; average grain size: 8.0 μm When a resin composition comprising a fluoro-resin and a fibrous filler was used, the fluoro-resin content in the resin composition was 80% by weight and the content of the fibrous filler was 20% by weight. When a resin composition comprising a fluoro-resin and a solid lubricant was used, the content of the fluoro-resin was 80% by weight and the content of the solid lubricant was 20% by weight in the resin composition. When a resin composition comprising a fluoro-resin, a fibrous filler and a solid lubricant was used, the content of the fluoro-resin was 70% by weight, the content of the fibrous filler was 10% by weight and the content of the solid lubricant was 20% by weight in the resin composition.

The resin composition was mixed as shown below for preventing flexion of the fibrous filler. That is, materials except for the fibrous filler were dry mixed by a Henschel mixer and then the mixture was placed in a two-shaft extruder. The fibrous filler was charged from a constant rate side feeder into the two-shaft extruder and mixed with the mixture described above. The kneading product was extruded and formed into pellets. The pellets of the resin composition or the pellets of the single component resin thus obtained were supplied to an injection molding machine and injection molded under injection conditions optimal to every materials.

Further, in the rolling bearings for No. 45–No. 50 and No. 70–No. 72, rolling elements made of ceramics and rolling elements made of PTFE were disposed alternately. In the rolling bearing for No. 69, only the rolling elements made of ceramics (SiC) were disposed.

For each of the rolling bearings thus assembled, a rotation test was conducted by using a bearing rotation tester manufactured by Nippon Seiko Co in an aqueous 1N sulfuric acid solution under the following conditions and bearing life based on vibration values was evaluated. That is, radial vibrations occurring in the bearings were always measured during rotation test, and the test was stopped at the instance the vibration value exceeded a level three times of the initial value and the life was defined as the total number of rotation up to the instance of stopping. Grease lubrication was not conducted for all of the rolling bearings from No. 1 to No. 86.

| Condition For Rotation Test | |
|---|---|
| Atmospheric Pressure | Normal Pressure |
| Atmospheric Temperature | Normal Temperature |

| Condition For Rotation Test | |
|---|---|
| Radial Load | 49N |
| Rotation speed | 300 rpm |

For comparing the life for each of the tested bearings, a relative value was calculated assuming the bearing life for No. 51 corresponding to the rolling bearing entirely made of metal in the prior art as "1". The results are also shown together in the following Tables 1 to 4.

TABLE 1

| | Constitutional material | | | |
|---|---|---|---|---|
| No. | Inner ring and outer ring | Rolling element | Cage | Working life (relative value) |
| 1 | ETFE | SUS440C | ETFE + KTW | 80 |
| 2 | PVDF | SUS440C | ETFE + KTW | 70 |
| 3 | ETFE | ES1 | ETFE + KTW | 100 |
| 4 | PVDF | ES1 | ETFE + KTW | 90 |
| 5 | ETFE | $Si_3N_4$ | ETFE + KTW | 300 |
| 6 | PVDF | $Si_3N_4$ | ETFE + KTW | 280 |
| 7 | PFA | $Si_3N_4$ | ETFE + KTW | 330 |
| 8 | ETFE + KTW | SUS440C | ETFE + ABW | 100 |
| 9 | PVDF + KTW | SUS440C | ETFE + KTW | 90 |
| 10 | ETFE + KTW | ES1 | ETFE + ABW | 120 |
| 11 | PVDF + KTW | ES1 | ETFE + KTW | 110 |
| 12 | ETFE + KTW | $Si_3N_4$ | ETFE + ABW | 400 |
| 13 | PVDF + KTW | $Si_3N_4$ | ETFE + KTW | 380 |
| 14 | PFA + KTW | $Si_3N_4$ | ETFE + KTW | 430 |
| 15 | ETFE + KTW | SiC | ETFE + ABW | 380 |
| 16 | PVDF + KTW | SiC | ETFE + ABW | 360 |
| 17 | PFA + KTW | SiC | ETFE + ABW | 400 |
| 18 | ETFE + KTW | Syalon | ETFE + ABW | 400 |
| 19 | PVDF + KTW | Hard carbon | ETFE + ABW | 390 |
| 20 | ETFE + KTW | $ZrO_2$ | ETFE + ABW | 350 |
| 21 | PVDF + KTW | Glass | ETFE + ABW | 330 |
| 22 | ETFE + ABW | $Al_2O_3$ | ETFE + ABW | 340 |
| 23 | PVDF + ABW | $Al_2O_3$ | ETFE + ABW | 320 |
| 24 | ETFE + aramid fiber | $Si_3N_4$ | ETFE + aramide fiber | 380 |
| 25 | PVDF + aramid fiber | $Si_3N_4$ | ETFE + aramide fiber | 350 |
| 26 | FTFE + carbon fiber | $Si_3N_4$ | ETFE + carbon fiber | 430 |
| 27 | PVDF + carbon fiber | $Si_3N_4$ | ETFE + carbon fiber | 400 |

TABLE 2

| No. | Inner ring and outer ring | Rolling element | Cage | Working life (relative value) |
|---|---|---|---|---|
| 28 | PFA + carbon fiber | $Si_3N_4$ | ETFE + carbon fiber | 450 |
| 29 | ETFE + PTFE | $Si_3N_4$ | ETFE + ABW | 350 |
| 30 | PVDF + PTFE | $Si_3N_4$ | ETFE + ABW | 330 |
| 31 | ETFE + MCA | $Si_3N_4$ | ETFE + ABW | 330 |
| 32 | PVDF + MCA | $Si_3N_4$ | ETFE + ABW | 310 |
| 33 | ETFE + fluorinated pitch | $Si_3N_4$ | ETFE + ABW | 340 |
| 34 | PVDF + fluorinated pitch | $Si_3N_4$ | ETFE + ABW | 320 |
| 35 | ETFE + PTFE + KTW | $Si_3N_4$ | ETFE + ABW | 450 |
| 36 | PVDF + PTFE + KTW | $Si_3N_4$ | ETFE + ABW | 430 |
| 37 | PVDF + PTFE + carbon fiber | $Si_3N_4$ | ETFE + ABW | 500 |
| 38 | ETFE + MCA + KTW | $Si_3N_4$ | ETFE + ABW | 420 |
| 39 | PVDF + MCA + KTW | $Si_3N_4$ | ETFE + ABW | 400 |
| 40 | ETFE + fluorinated pitch + ABW | $Si_3N_4$ | ETFE + ABW | 430 |
| 41 | PVDF + fluorinated pitch + ABW | $Si_3N_4$ | ETFE + ABW | 410 |
| 42 | ETFE + KTW | $Si_3N_4$ | With no cage (full type bearing) | 250 |
| 43 | PVDF + KTW | $Si_3N_4$ | With no cage (full type bearing) | 210 |
| 44 | PFA + ABW | SiC | With no cage (full type bearing) | 260 |
| 45 | ETFE + ABW | Rolling elements of $Si_3N_4$ and PTFE disposed alternately | With no cage (full type bearing) | 300 |
| 46 | PVDF + KTW | Rolling elements of $Si_3N_4$ and PTFE disposed alternately | With no cage (full type bearing) | 280 |
| 47 | ETFE + ABW | Rolling elements of SiC and PTFE disposed alternately | With no cage (full type bearing) | 300 |
| 48 | PVDF + KTW | Rolling elements of SiC and PTFE disposed alternately | With no cage (full type bearing) | 270 |
| 49 | ETFE + ABW | Rolling elements of $Al_2O_3$ and PTFE disposed alternately | With no cage (full type bearing) | 260 |
| 50 | PVDF + KTW | Rolling elements of $Al_2O_3$ and PTFE disposed alternately | With no cage (full type bearing) | 250 |
| 51 | SUS440C | SUS440C | SUS304 | 1 |
| 52 | SUS440C | SUS440C | Polyimide + glass fiber | 5 |
| 53 | SUS440C | SUS440C | ETFE + KTW | 20 |

TABLE 3

| No. | Inner ring and outer ring | Rolling element | Cage | Working life (relative value) |
|---|---|---|---|---|
| 54 | PVDF + KTW | SUS440C | PVDF + KTW | 100 |
| 55 | PFA + KTW | ES1 | PFA + ABW | 130 |
| 56 | PVDF + KTW | ES1 | PVDF + KTW | 120 |
| 57 | PVDF + KTW | $Si_3N_4$ | PVDF + KTW | 390 |
| 58 | PFA + ABW | $Si_3N_4$ | PFA + ABW | 440 |
| 59 | PVDF + KTW | SiC | PVDF + KTW | 370 |
| 60 | PVDF + KTW | Glass | PVDF + KTW | 310 |
| 61 | PVDF + KTW | $Al_2O_3$ | PVDF + KTW | 350 |

TABLE 3-continued

| No. | Constitutional material | | | Working life (relative value) |
|---|---|---|---|---|
| | Inner ring and outer ring | Rolling element | Cage | |
| 62 | PVDF + carbon fiber | $Si_3N_4$ | PVDF + carbon fiber | 420 |
| 63 | PVDF + PTFE | $Si_3N_4$ | PVDF + KTW | 340 |
| 64 | PVDF + MCA | $Si_3N_4$ | PVDF + KTW | 320 |
| 65 | PVDF + PTFE + KTW | $Si_3N_4$ | PVDF + KTW | 460 |
| 66 | PVDF + PTFE + carbon fiber | $Si_3N_4$ | PVDF + carbon fiber | 510 |
| 67 | PFA + MCA + carbon fiber | $Si_3N_4$ | PVDF + KTW | 410 |
| 68 | PTF + Fluoromica + KTW | $Si_3N_4$ | PVDF + KTW | 400 |
| 69 | PFA + KTW | SiC | With no cage (full type bearing) | 270 |
| 70 | ETFE + carbon fiber | Rolling elements of $Si_3N_4$ and PTFE disposed alternately | With no cage (full type bearing) | 310 |
| 71 | PVDF + carbon fiber | | With no cage (full type bearing) | 300 |
| 72 | PVDF + carbon fiber | Rolling elements of SiC and PTFE disposed alternately | With no cage (full type bearing) | 290 |

TABLE 4

| No. | Constitutional material | | | Working life (relative value) |
|---|---|---|---|---|
| | Inner ring and outer ring | Rolling element | Cage | |
| 73 | PEEK + carbon fiber | $Si_3N_4$ | PEEK + carbon fiber | 380 |
| 74 | (PEEK − PBI) + carbon fiber | SiC | (PEEK − PBI) + carbon fiber | 370 |
| 75 | PEN + carbon fiber | Syalon | PEN + carbon fiber | 350 |
| 76 | PEEK + KTW | $SI_3N_4$ | PEEK + carbon fiber | 350 |
| 77 | PEN + KTW | $Al_2O_3$ | PEN + carbon fiber | 320 |
| 78 | PEEK + PTFE | $ZrO_2$ | PEEK + carbon fiber + PTFE | 290 |
| 79 | (PEEK − PBI) + PTFE | $Al_2O_3$ | PEEK + carbon fiber + PTFE | 310 |
| 80 | PEN + MCA | carbon | PEEK + carbon fiber + PTFE | 300 |
| 81 | PEEK + carbon fiber + PTFE | $SI_3N_4$ | PEEK + carbon fiber + PTFE | 430 |
| 82 | PEEK + KTW + PTFE | SiC | PEEK + carbon fiber + PTFE | 400 |
| 83 | (PEEK − PBI) + carbon fiber + fluoromica | $SI_3N_4$ | (PEEK − PBI) + carbon fiber + PTFE | 410 |
| 84 | PEN + carbon fiber + fluoropitch | $Al_2O_3$ | PEN + carbon fiber + PTFE | 340 |
| 85 | PEN + KTW + TPFE | Glass | PEEK + carbon fiber + PTFE | 350 |
| 86 | PEEK | Hard carbon | PTFE | 50 |

As can be seen from the tables, bearings No. 1–No. 50 and No. 54–No. 85 corresponding to the examples of the present invention have much longer life under a corrosive circumstance compared with bearings No. 51–No. 53 and No. 86 corresponding to comparative examples. Further, it can be seen that bearings No. 5–No. 7, No. 12–No. 50 and No. 57–No. 72 having rolling elements made of ceramics or glass have longer life under a corrosive circumstance than bearings No. 1–No. 4, No. 8–No. 11 and No. 54–No. 56 having rolling elements made of metal.

Bearings No. 73–No. 85 are examples in which inner rings, outer rings and cages are made of resin compositions each comprising a melt-moldable heat resistant resin (except for fluoro-resin) as the main ingredient with addition of fibrous filler and/or solid lubricant. The bearing No. 86 is a comparative example in which the inner ring and the outer ring are made of PEEK corresponding to a melt-moldable heat resistant resin (except for fluoro-resin). It can be seen from the result of Table 4 that bearings No. 73–No. 85 have remarkably longer life under a corrosive circumstance as compared with the bearing No. 86.

Further, inner rings and outer rings were manufactured by resin compositions comprising PFA, ETFE, PVDF, PEEK and PEN as the main ingredient and a PTFE powder blended therewith as a solid lubricant at various ratios. Same rolling bearings as described above were assembled by using the inner rings and the outer rings (made of the same material as the inner rings), rolling elements made of silicon nitride ($Si_3N_4$) and cages made of a mixture of ETFE and potassium titanate whisker (KTW) (ETFE:KTW=80:20).

Figure 2:
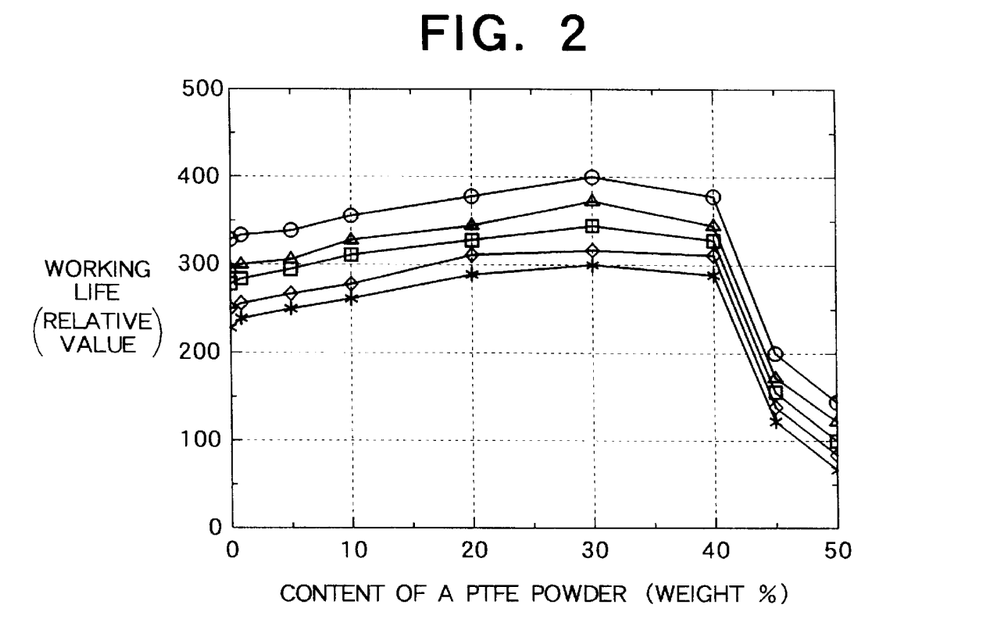
FIG. 2 is a graph showing a relation between the content of a PTFE powder in a resin composition constituting an inner ring and an outer ring of a bearing of the embodiment and a life of the bearing, obtained from the result of a test.

Using the bearings described above, a rotation test was conducted in the corrosive aqueous solution described above (aqueous 1N sulfuric acid solution) and the bearing life was evaluated in the same method based on the vibration value. Then, a relation between the content of the solid lubricant in the resin compositions constituting the inner ring and the outer ring and the bearing life was examined. The results are shown by a graph in FIG. 2. The results are shown by ⌊○⌋ for PFA as the main ingredient, ⌊Δ⌋ for ETFE as the main ingredient, ⌊□⌋ for PVDF as the main ingredient, ⌊◇⌋ for PEEK as the main ingredient and ⌊★⌋ for PEN as the main ingredient. The life shown in FIG. 2 is given as a relative value like that described above assuming the life for No. 51 as "1".

As can be seen from the figure, the life of the bearings in the corrosive aqueous solution can be improved by blending the PTFE powder as the solid lubricant at a content of 40% by weight or less with the resin compositions constituting the inner rings and the outer rings.

Further, inner rings and outer rings were manufactured by resin compositions comprising PFA, ETFE, PVDF, PEEK and PEN as the main ingredient and a potassium titanate whisker blended therewith as a fibrous filler at various ratios. Same rolling bearings as described above were assembled by using the inner rings and the outer rings (made of the same material as the inner rings), rolling elements made of silicon nitride ($Si_3N_4$) and cages made of a mixture of ETFE and potassium titanate whisker (KTW) (ETFE : KTW=80:20).

Figure 3:
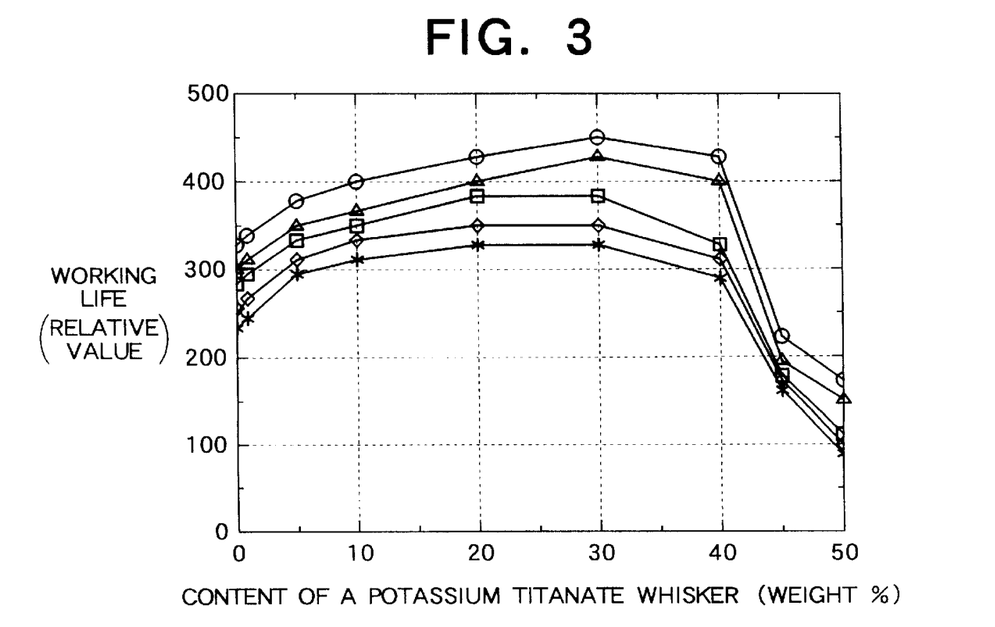
FIG. 3 is a graph showing a relation between the content of a potassium titanate whisker in a resin composition constituting an inner ring and an outer ring of a bearing of the embodiment and a life of the bearing, obtained from the result of a test.

Using the bearings described above, a rotation test was conducted in the corrosive aqueous solution described above (aqueous 1N sulfuric acid solution) and the bearing life was evaluated in the same method based on the vibration value. Then, a relation between the content of the fibrous filler in the resin composition constituting the inner ring and the outer ring and the bearing life was examined. The results are shown by a graph in FIG. 3. The results are shown by ⌊○⌋ for PFA as the main ingredient, ⌊Δ⌋ for ETFE as the main ingredient, ⌊□⌋ for PVDF as the main ingredient, ⌊◇⌋ for PEEK as the main ingredient and ⌊★⌋ for PEN as the main ingredient. The life shown in FIG. 3 is given as a relative value like that described above, assuming the life for No. 51 as "1".

As can be seen from the figure, the life of the bearings in the corrosive aqueous solution can be improved by blending the potassium titanate whisker as the fibrous filler at a content of 40% by weight or less with the resin compositions constituting the inner rings and the outer rings.

Further, inner rings and outer rings were manufactured by resin compositions comprising PFA, ETFE, PVDF, PEEK and PEN as the main ingredient and carbon fiber blended therewith as a fibrous filler at various ratios. Same rolling bearings as described above were assembled by using the inner rings and the outer rings (made of the same material as the inner rings), rolling elements made of silicon nitride ($Si_3N_4$) and cages made of a mixture of ETFE and potassium titanate whisker (KTW) (ETFE:KTW=80:20).

Figure 4:
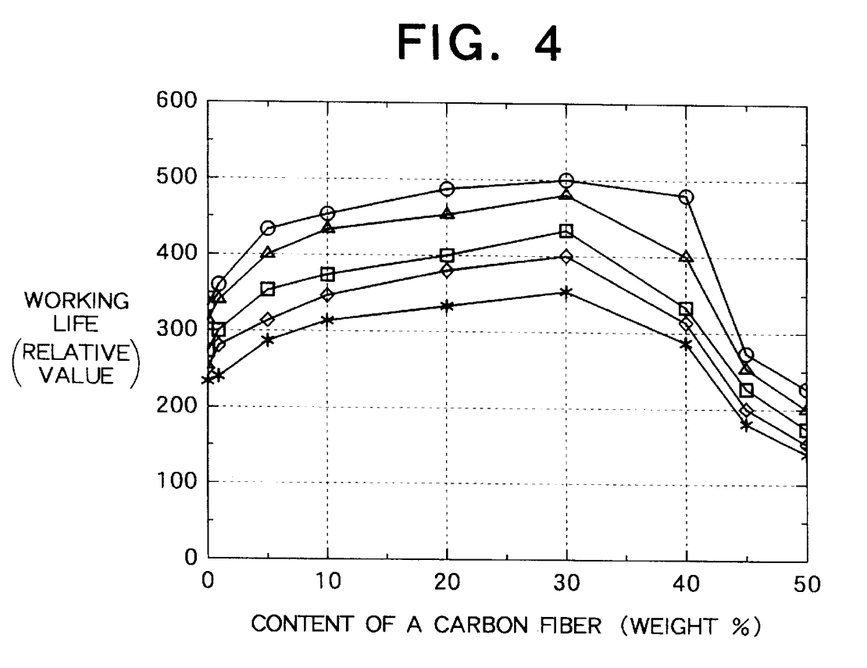
FIG. 4 is a graph showing a relation between the content of a carbon fiber in the resin composition constituting an inner ring and an outer ring of a bearing of the embodiment and a life of the bearing, obtained from the result of a test.

Using the bearings described above, a rotation test was conducted in the corrosive aqueous solution described above (aqueous 1N sulfuric acid solution) and the bearing life was evaluated in the same method based on the vibration value. Then, a relation between the content of the fibrous filler in the resin composition constituting the inner ring and the outer ring and the bearing life was examined. The results are shown by a graph in FIG. 4. The results are shown by ⌊○⌋ for PFA as the main ingredient, ⌊Δ⌋ for ETFE as the main ingredient, ⌊□⌋ for PVDF as the main ingredient, ⌊◇⌋ for PEEK as the main ingredient and ⌊★⌋ for PEN as the main ingredient. The life shown in FIG. 4 is given as a relative value like that described above, assuming the life for No. 51 as "1".

As can be seen from the figure, the life of the bearings in the corrosive aqueous solution can be improved by blending the carbon fiber as the fibrous filler at a content of 40% by weight or less with the resin compositions constituting the inner rings and the outer rings.

Further, inner rings and outer rings were manufactured by resin compositions comprising PFA, ETFE, PVDF, PEEK and PEN, potassium titanate whisker and PTFE powder. The content of the potassium titanate whisker in the resin compositions was made constant at 10% by weight while the content of the PTFE powder was varied to various ratios. The content of PFA or the like changes in accordance with the content of the PTFE powder. For example, if the content of the PTFE powder is 10% by weight, the content of PFA or the like in the resin composition is 80% by weight.

The same rolling bearings as described above were assembled by using the inner rings and the outer rings (made of the same material as the inner ring), rolling elements made of silicon nitride ($Si_3N_4$) and cages made of a mixture of ETFE and potassium titanate whisker (KTW) (ETFE : KTW=80:20).

Figure 5:
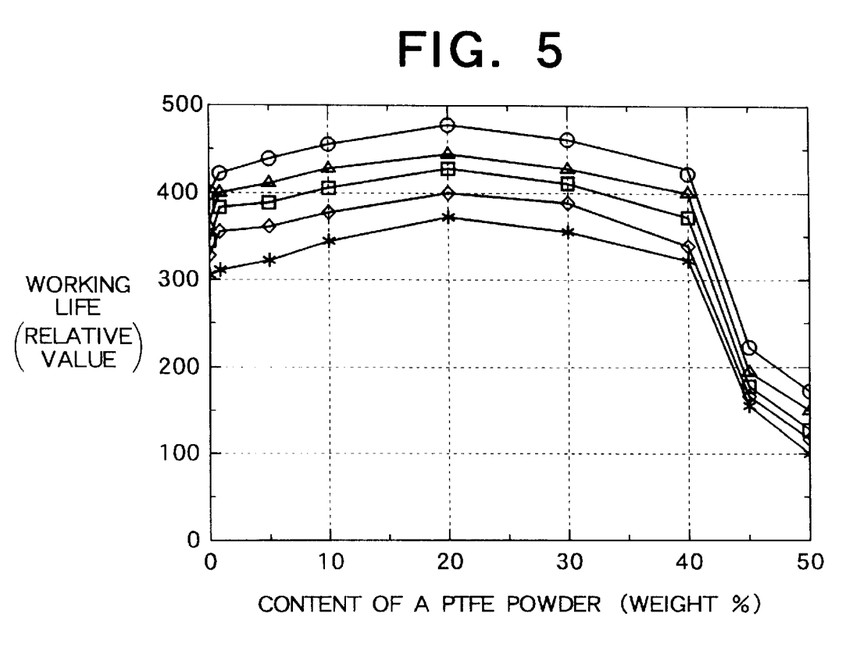
FIG. 5 is a graph showing a relation between the content of a PTFE powder in the resin composition (containing potassium titanate whisker at a predetermined ratio) constituting an inner ring and an outer ring of a bearing of the embodiment and a life of the bearing, obtained from the result of a test.

Using the bearings described above, a rotation test was conducted in the corrosive aqueous solution described above (aqueous 1N sulfuric acid solution) and the bearing life was evaluated in the same method based on the vibration value. Then, a relation between the content of the solid lubricant in the resin composition constituting the inner ring and the outer ring and the bearing life was examined. The results are shown by a graph in FIG. 5. The results are shown by ⌊○⌋ for PFA as the main ingredient, ⌊Δ⌋ for ETFE as the main ingredient, ⌊□⌋ for PVDF as the main ingredient, ⌊◇⌋ for PEEK as the main ingredient and ⌊★⌋ for PEN as the main ingredient. The working life shown in FIG. 5 is represented as a relative value like that as described above assuming the life for No. 51 as "1".

As can be seen from the figure, when resin compositions in which potassium titanate whisker is blended at a content of 10% by weight are used as the resin compositions constituting the inner rings and the outer rings, the life of the bearings in the corrosive aqueous solution can be made longer by blending the PTFE powder at a content of 40% by weight or less (preferably 10 to 30% by weight) in the resin compositions. Further, from comparison between FIG. 5 and FIG. 2 to FIG. 4, it can be seen that the life can be made longer compared with the case of blending only the solid lubricant (PTFE powder) or only the fibrous filler (potassium titanate whisker or carbon fiber) by lending both of them.

Further, inner rings and outer rings were manufactured by resin compositions comprising PFA, ETFE, PVDF, PEEK and PEN, carbon fiber and PTFE powder. The content of the carbon fiber in the resin compositions was made constant at 10% by weight while the content of the PTFE powder was varied to various ratios. The content of PFA or the like changes in accordance with the content of the PTFE powder. For example, if the content of the PTFE powder is 10% by weight, the content of PFA or the like in the resin composition is 80% by weight.

The same rolling bearings as described above were assembled by using the inner rings and the outer rings (made of the same material as the inner ring), rolling elements made of silicon nitride ($Si_3N_4$) and cages made of a mixture of ETFE and potassium titanate whisker (KTW) (ETFE : KTW=80:20).

Figure 6:
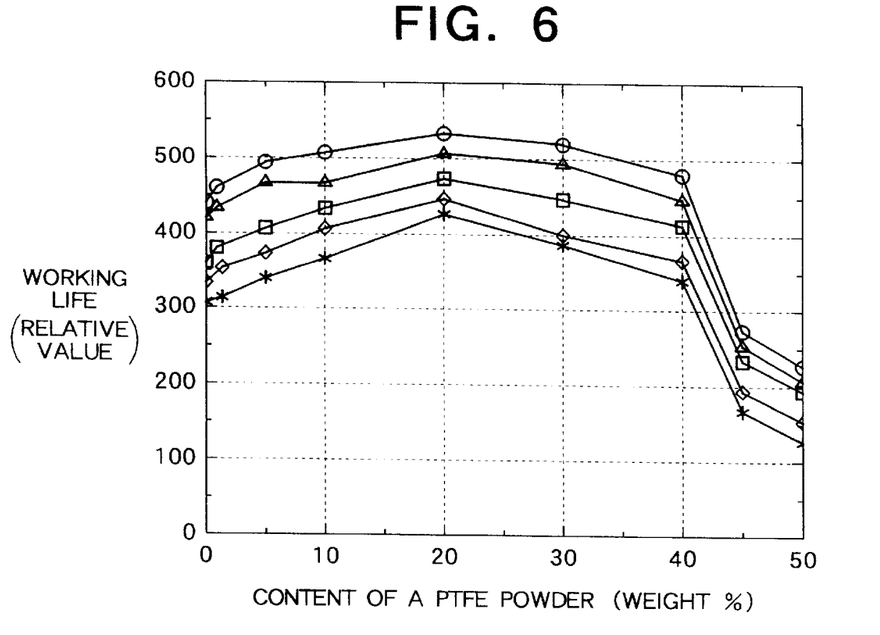
FIG. 6 is a graph showing a relation between the content of a PTFE powder in the resin composition (containing carbon fiber at a predetermined ratio) constituting an inner ring and an outer ring of a bearing of the embodiment and a life of the bearing, obtained from the result of a test.

Using the bearings described above, a rotation test was conducted in the corrosive aqueous solution described above (aqueous 1N sulfuric acid solution) and the bearing life was evaluated in the same method based on the vibration value. Then, a relation between the content of the solid lubricant in the resin compositions constituting the inner ring and the outer ring and the bearing life was examined. The results are shown in FIG. 6. The results are shown by [○] for PFA as the main ingredient, [△] for ETFE as the main ingredient, [□] for PVDF as the main ingredient, [◇] for PEEK as the main ingredient and [★] for PEN as the main ingredient. The life shown in FIG. 6 is given as a relative value like that as described above, assuming the life for No. 51 as "1".

As can be seen from the figure, when resin compositions in which the carbon fiber is blended at a content of 10% by weight are used as the resin composition constituting the inner rings and the outer rings, the life of the bearings in the corrosive aqueous solution can be improved by blending the PTFE powder at a content of 40% by weight or less (preferably 10 to 30% by weight) in the resin compositions. Further, from comparison between FIG. 6 and FIG. 2 to FIG. 4, it can be seen that the life can be made longer compared with the case of blending only the solid lubricant (PTFE powder) or only the fibrous filler (potassium titanate whisker or carbon fiber), by blending both of them.

Further, inner rings and outer rings were manufactured by resin compositions comprising PFA, PVDF, PEEK and PEN, potassium titanate whisker and PTFE powder. The content of the PTFE powder was made constant at 10% by weight in the resin compositions while the content of the potassium titanate whisker was varied to various ratios. The content of PFA or the like changes in accordance with the content of the PTFE powder. For example, if the content of potassium titanate whisker powder is 10% by weight, the content of PFA or the like in the resin composition was 80% by weight.

The same rolling bearings as described above were assembled by using the inner rings and the outer rings (made of the same material as the inner ring), rolling elements made of silicon nitride ($Si_3N_4$) and cages made of a mixture of PVDF and potassium titanate whisker (KTW) (PVDF:KTW=80:20).

Figure 7:
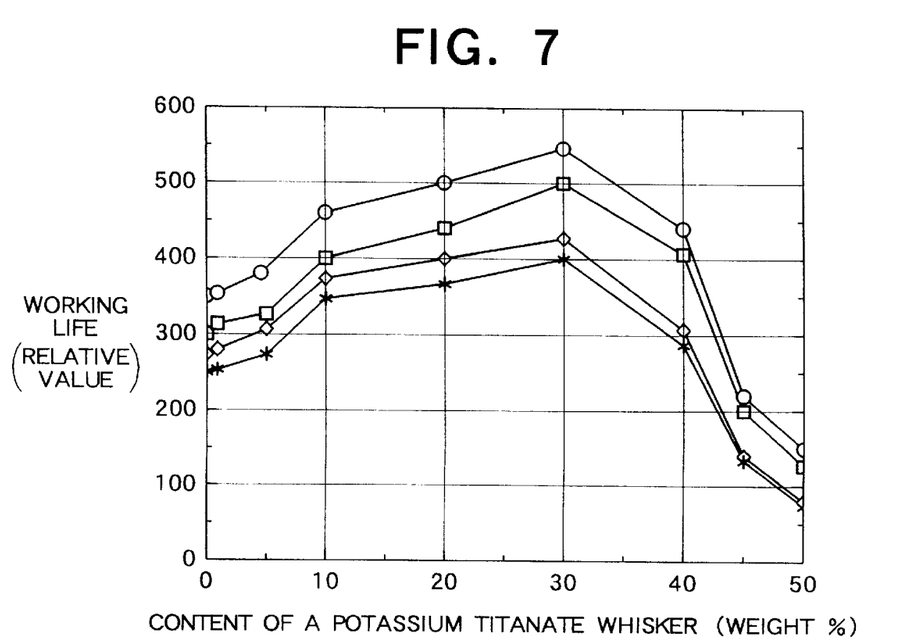
FIG. 7 is a graph a relation between the content of potassium titanate whisker in the resin composition (containing PTFE powder at a predetermined ratio) constituting an inner ring and an outer ring of the embodiment of a bearing and a life of the bearing, obtained from the result of a test.

Using the bearings described above, a rotation test was conducted in the corrosive aqueous solution described above (aqueous 1N sulfuric acid solution) and the bearing life was evaluated in the same method based on the vibration value. Then, a relation between the content of the solid lubricant in the resin composition constituting the inner ring and the outer ring with the life was examined. The results are shown by a graph in FIG. 7. In the figure, the results are shown by [○] for PFA as the main ingredient, [□] for PVDF as the main ingredient, [◇] for PEEK as the main ingredient and [★] for PEN as the main ingredient. The life shown in FIG. 7 is represented as a relative value like that as described above, assuming the life for No. 51 as "1".

As can be seen from the figure, when resin compositions in which the PTFE powder is blended at a content of 10% by weight are used as the resin composition constituting the inner rings and the outer rings, the life of the bearings in the corrosive aqueous solution can be made longer by blending the potassium titanate whisker at a content of 40% by weight or less (preferably 10 to 30% by weight) in the resin compositions. Further, from comparison between FIG. 7 and FIG. 2 to FIG. 4, it can be seen that the life can be made longer compared with the case of blending only the solid lubricant (PTFE powder) or only the fibrous filler (potassium titanate whisker or carbon fiber) by blending both of them.

EXAMPLE 2

No. 87–No. 98

As the rolling bearings used for test, single row deep groove ball bearings corresponding to bearing No. 6000 (10 mm inner diameter, 26 mm outer diameter, 8 mm width) were assembled for No. 87–No. 95. As shown in FIG. 1, the bearing comprises an outer ring 1, an inner ring 2, balls (rolling elements) 3 and a crown type cage 4, with no provision of seals. Further, full type ball bearings using the same shape of inner rings, outer rings and balls as those for the deep groove ball bearings described above, not using a cage and with no provision of seals were assembled for No. 96–No. 98 rolling bearings.

Constituent materials for the inner rings, outer rings, rolling elements and cages for each of the bearings are shown in the following Table 5. Identical material was used for the inner rings and the outer rings on every sample. The inner rings and the outer rings for each of the samples and the cages for No. 87–No. 95 were manufactured by injection molding. The resin and the additive materials used were as shown below.

Melt Moldable Fluoro Resin
  PFA: "NEOFLON PFA AP-201" manufactured by Daikin Industry
  PVDF: "KUREHA KF POLYMER-T-#1000" or "KUREHA KF POLYMER-T-#850" manufactured by Kureha Chemical Industry
Melt Moldable Heat Resistant Resin
  TPI: "ORAM 400" manufactured by Mitsui Toatsu Chemical
  PEN: "ID300" manufactured by Idemitsu Material
  PEEK: "VICTREX PEEK 150G" manufactured by Victrex
  PEEK-PBI: "CELLASOL TU-60" manufactured by Hoechst Celanese
  PPS: "LIGHTON R-6" manufactured by Phillips Petroleum Co.
Liquid Crystal Polymer
  LCP 1 (Wholly aromatic liquid crystal polymer)
    "SUMICASUPER LCP E 6000" manufactured by Sumitomo Chemical Industry
  LCP 2 (Semi-aromatic liquid crystal polymer)
    "NOVACCURATE E310" manufactured by Mitsubishi Kasei
Solid Lubricant
  PTFE: [LUBLON L-5] manufactured by Daikin Industry, powder of average grain size of 0.2 μm Fibrous Filler Potassium titanate whisker (simply referred to as "KTW" in Table 5);

"TISMO D-101" manufactured by Ohtsuka Kagaku, average fiber diameter: 0.3–0.6 μm, length: 10~20 μm Carbon fiber: "KUREKACHOP M-102S" manufactured by Kureha Kagaku Kogyo, average fiber diameter: 14.5 μm, length: 0.2 mm When a resin composition comprising a melt-moldable heat resistant resin or a fluoro-resin (hereinafter simply referred to as "melt-moldable resin") and a liquid crystal polymer was used, the content of the melt-moldable resin was 70% by weight and the content of the liquid crystal polymer was 30% by weight in the resin composition. When a resin composition comprising a melt-moldable resin, a liquid crystal polymer and a fibrous filler or a solid lubricant was used, the content of the melt-moldable resin was 60% by weight, the content of the liquid crystal polymer was 20% by weight and the content of the fibrous filler or the solid lubricant was 20% by weight in the resin composition.

When a resin composition comprising a melt-moldable resin, a liquid crystal polymer, a fibrous filler and a solid lubricant was used, the content of the melt-moldable resin was 50% by weight, the content of the liquid crystal polymer was 20% by weight, the content of the fibrous filler was 10% by weight and the content of the solid lubricant was 20% by weight in the resin composition.

The resin composition was mixed in the procedures shown below for preventing flexion of the fibrous filler. That is, materials except for the fibrous filler were at first dry mixed in a Henschel mixer and then the mixture was charged in a two-shaft extruder. The fibrous filler was charged from a constant rate side feeder into the two-shaft extruder and kneaded with the mixture described above. The kneading product was extruded and formed into pellets. The thus obtained pellets of the resin composition or the pellets of the single resin component were fed to an injection molding machine and injection molded under optimal injection conditions for every material.

Further, in No. 96 rolling bearing, only the rolling elements made of ceramics ($Si_3N_4$) were disposed. In No. 97 rolling bearing, rolling elements made of ceramics ($Si_3N_4$) and rolling elements made of PTFE were disposed alternately. In No. 98 rolling bearing, rolling elements made of glass and rolling elements made of hard carbon were disposed alternately.

For each of the rolling bearings thus assembled, a rotation test was conducted by using a bearing rotation tester manufactured by Nippon Seiko Co. in an aqueous 1N sulfuric acid solution under the following conditions and the bearing life was evaluated based on the vibration value. Namely, radial vibrations occurring in the bearings were always measured during the rotation test, the test was stopped at the instance the vibration value exceeded a level three times of the initial value and the total number of rotation up to the instance of stopping was defined as the life. Grease lubrication was not conducted to all rolling bearings No. 87~No. 98.

| Conditions For Rotation Test | |
|---|---|
| Atmospheric Pressure | Normal Pressure |
| Atmospheric Temperature | Normal Temperature |
| Radial Load | 49N |
| Rotational speed | 300 rpm |

Further, for comparing the life for each of tested bearings, a relative value was calculated based on the life being assumed as "1" for No. 51 corresponding to the rolling being entirely made of metal in the prior art. The results are also shown together in the following Table 5.

TABLE 5

| | Constitutional material | | | Working life |
|---|---|---|---|---|
| No. | Inner ring and outer ring | Rolling element | Cage | (relative value) |
| 87 | PEN + LCP1 | SUS440C | PVDF + KTW | 70 |
| 88 | (PEEK − PBI) + LCP2 | Syalon | PVDF + KTW | 280 |
| 89 | PFA + LCP2 + carbon fiber | SiC | PVDF + KTW | 460 |
| 90 | PPS + LCP1 + KTW | $Si_3N_4$ | PVDF + KTW | 300 |
| 91 | PVDF + LCP1 + KTW | Glass | PVDF + KTW | 380 |
| 92 | TPI + LCP1 + PTFE | Hard carbon | PVDF + KTW | 300 |
| 93 | (PEEK − PBI) + LCP1 + PTFE | $ZrO_2$ | PVDF + KTW | 320 |
| 94 | TPI + LCP1 + PTFE + carbon fiber | $Al_2O_3$ | PVDF + KTW | 340 |
| 95 | PEEK + LCP1 + PTFE + KTW | SiC | PVDF + KTW | 450 |
| 96 | PVDF + LCP1 + PTFE + carbon fiber | $Si_3N_4$ | With no cage (full type bearing) | 300 |
| 97 | PEN + LCP1 + PTFE + KTW | Rolling elements of $Si_3N_4$ and PTFE disposed alternately | With no cage (full type bearing) | 350 |
| 98 | (PEEK − PBI) + LCP1 + PTFE + KTW | Rolling elements made of glass and hard carbon disposed alternately | With no cage (full type bearing) | 310 |

As can be seen from the table, the bearings for No. 89 –No. 98 corresponding to the example of the present invention have remarkably improved life under a corrosive circumstance compared with bearings for No. 51–No. 53 and No. 86 corresponding to the comparative example. Further, the bearings for No. 87–No. 98 in which inner rings and outer rings are made of resin compositions with addition of liquid crystal polymers have longer life under a corrosive circumstance compared with No. 86 bearing in which the inner bearing and the outer bearing are made of only PEEK. Further, among the bearings for No. 87–No. 98, bearings No. 88–No. 98 in which rolling elements are made of ceramic or glass have longer life under a corrosive circumstance compared with No. 87 bearings in which the rolling elements are made of metal.

Further, inner rings and outer rings were manufactured by resin compositions in which LCP1 was blended at various ratios to PVDF, PEEK, TP1 and PEN. The same rolling bearings as described above were assembled by using the inner rings and the outer rings (made of the same materials for inner rings), the rolling elements made of silicon nitride ($Si_3N_4$) and cages made of a mixture of PVDF and potassium titanate whisker (KTW) (PVDF:KTW=80:20).

A rotation test was conducted using the bearings in the corrosive aqueous solution (aqueous 1N sulfuric acid solution) described above and the life was evaluated by the same method based on vibration values. Then, a relation between LCP1 (liquid crystal polymer) in the resin composition constituting the inner ring and the outer ring, and the bearing life was examined.

Figure 8:
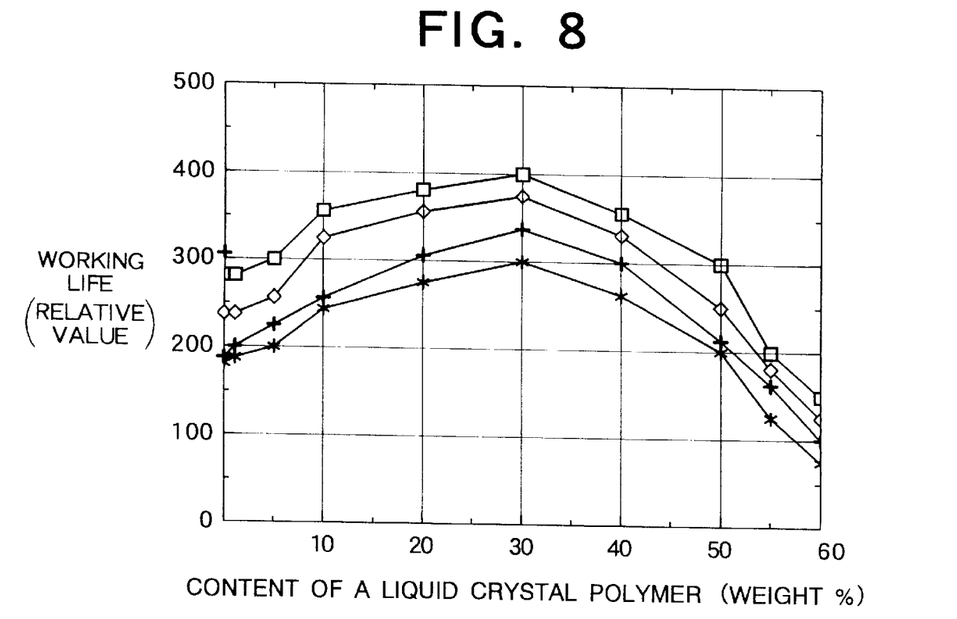
FIG. 8 is a graph showing a relation between the content of a liquid crystal polymer in the resin composition constituting an inner ring and an outer ring of a bearing of the embodiment and a life of the bearing, obtained from the result of a test.

The results are shown by graphs in FIG. 8. The results are shown by ⌊□⌋ for the resin composition comprising PVDF and LCP1, ⌊◇⌋ for the resin composition comprising PEEK and LCP1, ⌊+⌋ for the resin composition comprising TPI and LCP1 and ⌊★⌋ for the resin composition comprising PEN and LCP1. The life shown in FIG. 8 is represented as a relative value like that described above, assuming the life for No. 51 as "1".

As can be seen from the figure, the life of the bearings in the corrosive aqueous solution can be improved by blending the LCPI at a content of 50% by weight or less (preferably, from 10 to 40% by weight) with the resin composition constituting the inner ring and the outer ring.

Further, inner rings and outer rings were manufactured by resin compositions comprising PVDF, PEEK, TPI and PEN, and LCP1 and PTFE powder. The content of the LCP1 in the resin compositions was made constant at 20% by weight while the content of the PTFE powder was varied to various ratios. The content of PVDF or the like changes in accordance with the content of the PTFE powder. For example, if the content of the PTFE powder is 10% by weight, the content of PVD or the like in the resin composition is 70% by weight.

The same rolling bearings as described above were assembled by using the inner rings and the outer rings (made of the same material as the inner ring), rolling elements made of silicon nitride ($Si_3N_4$) and cages made of a mixture of PVDF and potassium titanate whisker (KTW) (PVDF:KTW=80:20).

Using the bearings described above, a rotation test was conducted in the corrosive aqueous solution described above (aqueous 1N sulfuric acid solution) and the bearing life was evaluated in the same method based on the vibration value. Then, a relation between the content of the PTFE powder (solid lubricant) in the resin compositions constituting the inner ring and the outer ring and the life was examined. The results are shown by a graph in FIG. 9. In the figure, the results are shown by ⌊□⌋ for PVDF as the main ingredient, ⌊◇⌋ for PEEK as the main ingredient, ⌊+⌋ for TPI as the main ingredient, and ⌊★⌋ for PEN as the main ingredient.

Figure 9:
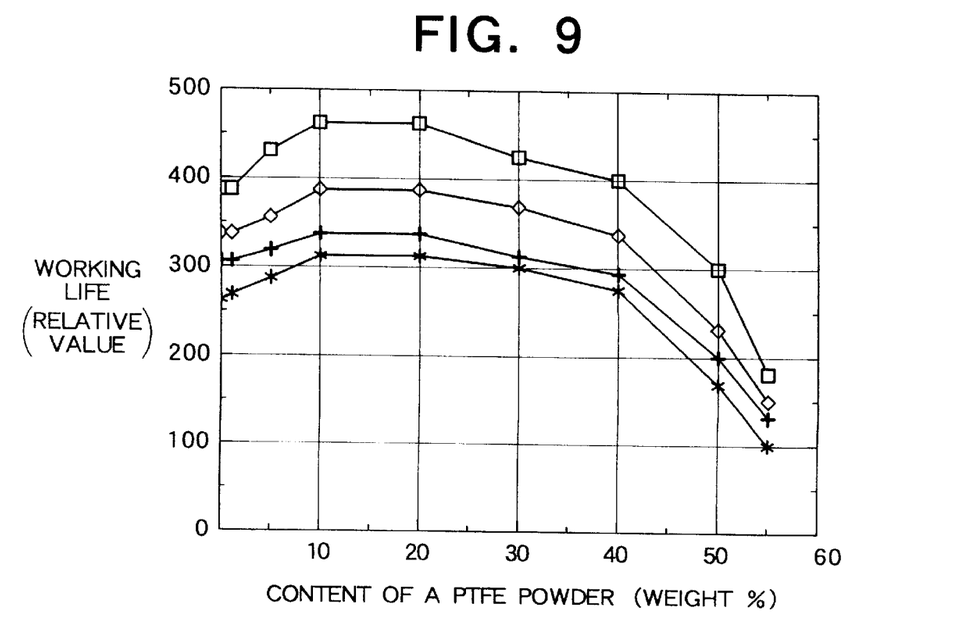
FIG. 9 is a graph showing a relation between the content of a PTFE powder in the resin composition (containing liquid crystal polymer at a predetermined ratio) constituting an inner ring and an outer ring of a bearing of the embodiment and a life of the bearing, obtained from the result of a test.

The life shown in FIG. 9 is given as a relative value like that as described above, assuming the life for No. 51 as "1".

As can be seen from the figure, when resin compositions in which the LCP1 is blended at a content of 20% by weight are used as the resin composition constituting the inner ring and the outer ring, the life of the bearings in the corrosive aqueous solution can be improved by blending the PTFE powder at a content of 40% by weight or less (preferably 10 to 30% by weight) in the resin compositions.

Further, inner rings and outer rings were made of resin compositions comprising PVDF, PEEK, TPI and PEN, and LCP1 and potassium titanate whisker. The content of the LCP1 in the resin compositions was made constant at 20% by weight while the content of the potassium titanate whisker was varied to various ratios. The content of PVDF or the like changes in accordance with the content of the potassium titanate whisker. For example, if the content of the potassium titanate whisker is 10% by weight, the content of PVDF or the like in the resin composition is 70% by weight.

The same rolling bearings as described above were assembled by using the inner rings and the outer rings (made of the same material as the inner ring), rolling elements made of silicon nitride ($Si_3N_4$) and cages made of a mixture of PVDF and potassium titanate whisker (KTW) (PVDF:KTW=80:20).

Figure 10:
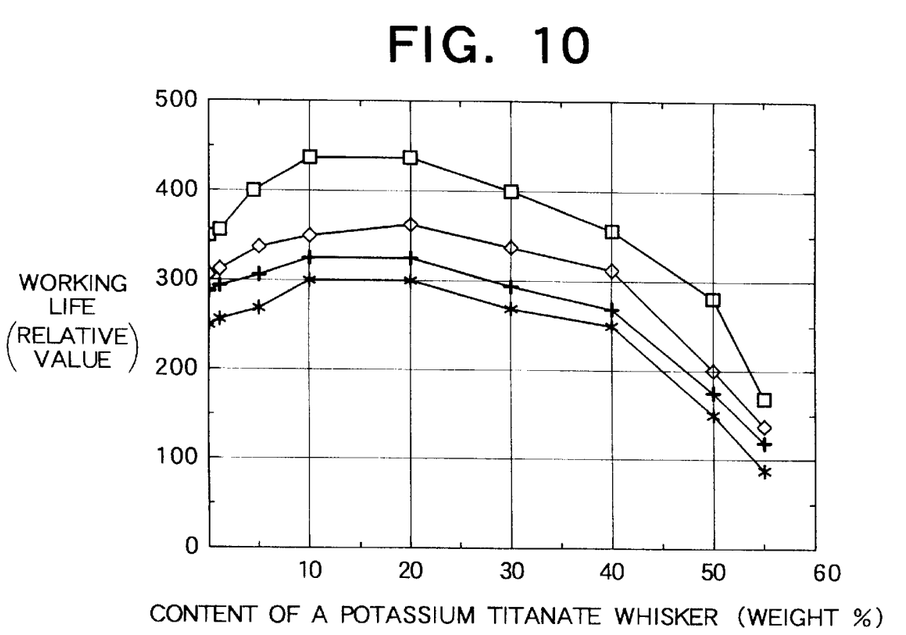
FIG. 10 is a graph showing a relation between the content of a potassium titanate whisker in the resin composition (containing liquid crystal polymer at a predetermined ratio) constituting an inner ring and an outer ring of a bearing of the embodiment and a life of the bearing, obtain the result of a test.

Using the bearings described above, a rotation test was conducted in the corrosive aqueous solution described above (aqueous 1N sulfuric acid solution) and the bearing life was evaluated in the same method based on the vibration value. Then, a relation between the content of potassium titanate whisker (fibrous filler) in the resin compositions constituting the inner ring and the outer ring and the bearing life was examined. The results are shown by a graph in FIG. 10. In the figure, the results are shown by ⌊□⌋ for PVDF as the main ingredient, ⌊◇⌋ for PEEK as the main ingredient, ⌊+⌋ for TPI as the main ingredient, and ⌊★⌋ for PEN as the main ingredient. The life shown in FIG. 10 is given as a relative value like that as described above, assuming the life for No. 51 as "1".

As can be seen from the figure, when resin compositions in which the LCP1 is blended at a content of 20% by weight are used as the resin composition constituting the inner rings and the outer rings, the life of the bearings in the corrosive aqueous solution can be improved by blending the potassium titanate whisker at a content of 40% by weight or less (preferably 5 to 30% by weight) in the resin compositions.

Further, inner rings and outer rings were made of resin compositions comprising PVDF, PEEK, TPI and PEN, and LCP1, potassium titanate whisker and a PTFE. The contents of the LCP1 and the potassium titanate whisker in the resin compositions were made constant each at 15% by weight while the content of the PTFE powder was varied to various ratios. The content of PVDF or the like changes in accordance with the content of the PTFE powder. For example, if the content of the PTFE powder is 10% by weight, the content of PVDF or the like in the resin composition is 60% by weight.

The same rolling bearings as described above were assembled by using the inner rings and the outer rings (made of the same material as the inner ring), rolling elements made of silicon nitride ($Si_3N_4$) and cages made of a mixture of PVDF and potassium titanate whisker (KTW) (PVDF:KTW=80:20).

Using the bearings described above, a rotation test was conducted in the corrosive aqueous solution described above (aqueous 1N sulfuric acid solution) and the bearing life was evaluated in the same method based on the vibration value.

Figure 11:
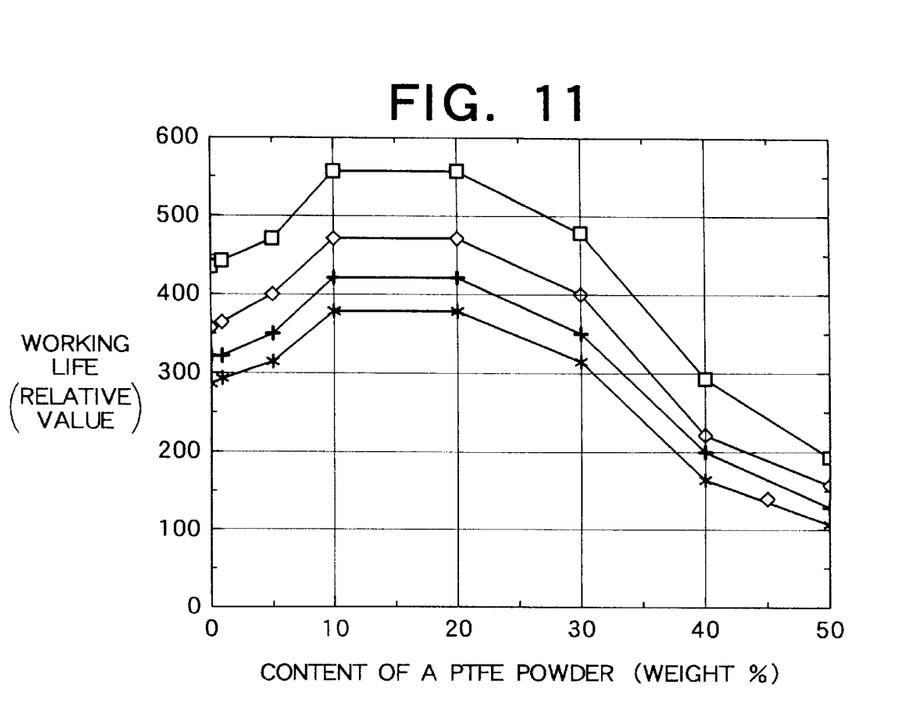
FIG. 11 is a graph showing a relation between the content of a PTFE powder in the resin composition (containing liquid crystal polymer and a potassium titanate whisker at a predetermined ratio) constituting an inner ring and an outer ring of a bearing of the embodiment and a working life of the bearing, obtained from the result of a test.

Then, a relation between the content of the PTFE powder (solid lubricant) in the resin composition constituting the inner ring and the outer ring and the life was examined. The results are shown by a graph in FIG. 11. In the figure, the results are shown by [□] for PVDF as the main ingredient, [◇] for PEEK as the main ingredient, [+] for TPI as the main ingredient, and [★] for PEN as the main ingredient. The life shown in FIG. 11 is given as a relative value like that as described above, assuming the life for No. 51 as "1".

As can be seen from the figure, when resin compositions in which the LCP1 and potassium titanate whisker are blended each at a content of 15% by weight is used as the resin composition constituting the inner rings and the outer rings, the life of the bearings in the corrosive aqueous solution can be improved by blending the PTFE powder at a content of 30% by weight or less (preferably 5 to 30% by weight) in the resin compositions.

As has been explained above, in the rolling bearing according to the present invention, corrosion resistance in a corrosive an aqueous acidic or alkaline solution and under a circumstance in which mists or droplets of a corrosive aqueous solution are present can be improved, compared with corrosion resistant rolling bearings of the prior art. Further, lubricity can be kept for a long period of time with no supply of lubricant or grease to the inside of the bearings. Since this can eliminate requirement for supplying the lubricant or grease to the inside of the bearing, there is no worry of contaminating external circumstance by the lubricant.

Further, since the melt-moldable fluoro-resin or heat resistant resin is used as the material for the inner ring, outer ring and the cage, they can be manufactured, for example, by injection molding having excellent mass productivity, and the manufacturing cost for the bearings can be reduced.

Further, moldability, mechanical strength and wear resistance of the inner rings, outer rings or cages can be improved by adding a liquid crystal polymer to resin compositions forming the inner rings, outer rings or cages.

What is claimed is:

1. A rolling bearing comprising at least an inner ring, an outer ring and rolling elements made of a corrosion resistant material, characterized in that:

at least one of the inner ring and the outer ring is made of any one of a melt moldable fluoro-resin, a resin composition comprising the melt moldable fluoro-resin as a main ingredient or a resin composition comprising a melt moldable heat resistant resin incorporated with a fibrous filler and/or a solid lubricant.

2. A rolling bearing according to claim 1, further having a cage made of a resin composition wherein the cage comprises a resin composition in which a fibrous filler and/or a solid lubricant is added to a melt moldable fluoro-resin or a resin composition in which a fibrous filler and/or a solid lubricant is added to a melt moldable heat resistant resin.

3. A rolling bearing according to claim 2, wherein the resin composition contains a liquid crystal polymer at a ratio of 50% by weight or less.

4. A rolling bearing according to claim 1, wherein the resin composition contains a liquid crystal polymer at a ratio of 50% by weight or less.

5. A rolling bearing according to claim 1, wherein the resin composition forming at least one of the inner ring and the outer ring contains a fibrous filler comprising potassium titanate whisker or carbon fiber or a solid lubricant comprising a polytetrafluoroethylene (PTFE) powder at a ratio of 40% by weight or less.

6. A rolling bearing according to claim 1, wherein the resin composition forming at least one of the inner ring and the outer ring contains a fibrous filler comprising potassium titanate whisker or carbon fiber and a solid lubricant comprising polytetrafluoroethylene (PTFE) powder each by 40% by weight or less and by a total content of 50% by weight or less.

7. A rolling bearing comprising at least an inner ring, an outer ring and rolling elements made of a corrosion resistant material, characterized in that:

at least one of the inner ring and the outer ring comprises a resin composition in which a liquid crystal polymer is added by at a ratio of 50% by weight or less to a melt-moldable fluoro-resin or a melt-moldable heat resistant resin.

* * * * *